United States Patent [19]

Hale et al.

[11] Patent Number: 5,314,031
[45] Date of Patent: May 24, 1994

[54] DIRECTIONAL DRILLING PLUG

[75] Inventors: Arthur H. Hale, Houston; Kenneth M. Cowan, Sugar Land; James J. W. Nahm, Houston, all of Tex.

[73] Assignee: Shell Oil Company, Houston, Tex.

[21] Appl. No.: 964,813

[22] Filed: Oct. 22, 1992

[51] Int. Cl.⁵ .................... E21B 7/06; E21B 33/13
[52] U.S. Cl. .................... 175/61; 166/292; 166/295
[58] Field of Search ............ 166/292, 293, 294, 295; 175/61, 62, 64, 65

[56] References Cited

U.S. PATENT DOCUMENTS

| | | |
|---|---|---|
| 2,336,723 | 12/1943 | Drummond . |
| 2,649,160 | 8/1953 | Williams et al. . |
| 2,776,112 | 1/1957 | Ilfrey et al. ............ 175/64 X |
| 2,822,873 | 2/1958 | Harmsen et al. . |
| 2,868,294 | 1/1959 | Beale, Jr. et al. ............ 166/292 |
| 2,880,096 | 3/1959 | Hurley . |
| 2,895,301 | 7/1959 | Casagrande et al. . |
| 2,899,329 | 8/1959 | Lyons . |
| 2,938,353 | 3/1960 | Vorenkamp . |
| 2,961,044 | 11/1960 | Shell . |
| 3,021,680 | 2/1962 | Hayward . |
| 3,077,740 | 2/1963 | Hemwall . |
| 3,111,006 | 11/1963 | Caron . |
| 3,168,139 | 2/1965 | Kennedy et al. . |
| 3,412,564 | 11/1968 | McClintock . |
| 3,499,491 | 3/1970 | Wyant et al. . |
| 3,557,876 | 1/1971 | Tragesser . |
| 3,670,832 | 6/1972 | Striegler . |
| 3,675,728 | 7/1972 | Faulk et al. . |
| 3,712,393 | 1/1973 | Sheldahl et al. . |
| 3,724,562 | 4/1973 | Striegler . |
| 3,820,611 | 6/1974 | King . |
| 3,835,939 | 9/1974 | McEntire . |
| 3,887,009 | 6/1975 | Miller et al. . |
| 3,962,878 | 6/1976 | Hansen . |
| 3,964,921 | 6/1976 | Persinski et al. . |
| 4,014,174 | 3/1977 | Mondshine . |
| 4,037,424 | 7/1977 | Anders . |
| 4,057,116 | 11/1977 | Striegler . |
| 4,215,952 | 8/1980 | Baardsen . |
| 4,252,471 | 2/1981 | Straub . |
| 4,335,980 | 6/1982 | DePriester . |
| 4,338,134 | 7/1982 | Munster . |
| 4,425,055 | 1/1984 | Tiedemann . |
| 4,427,320 | 1/1984 | Bhula . |
| 4,450,009 | 5/1984 | Childs et al. . |
| 4,460,292 | 7/1984 | Durham et al. . |
| 4,518,508 | 5/1985 | Conner ............ 210/751 |

(List continued on next page.)

FOREIGN PATENT DOCUMENTS

| | | |
|---|---|---|
| 85-144069/24 | 7/1983 | Japan . |
| 61-48454 | 3/1986 | Japan . |
| 833704 | 6/1981 | U.S.S.R. . |

OTHER PUBLICATIONS

"Deep Cement Mixing Experience in Japan", by G. Dennis et al, Copyright 1985 Seabed Strengthening Symposium, Denver, Colo., Jun. 4, 1985, TP 85-5.

"Mud Disposal: An Industry Perspective", Hanson et al, Drilling, May 1986, pp. 16–21.

"Waste Minimization Program Can Reduce Drilling Costs", Hall et al, Oryx Energy Co., Houston, Tex., Oil & Gas Journal, Jul. 1, 1991, pp. 43–46.

"Phosphoric Acids and Phosphates", Kirk-Othmer Enc. of Chemical Technology, 3rd Ed., vol. 17, p. 477.

"Conversion of Drilling Fluids to Cements with Blast Furnace Slag-Performance Properties and Applications for Well Cementing", SPE Paper 24575 (Oct. 4, 1992) by Cowan et al.

"Quantitative Interpretation of X-Ray Diffraction Patterns of Mixtures.I.Matrix-Flushing Method of Quantitative Multicomponent Analysis" by Frank H. Chung, J. Appl. Cryst. (1974) 7, pp. 519–525.

*Primary Examiner*—George A. Suchfield

[57] ABSTRACT

During directional drilling operation, in order to achieve the correct angle and direction when drilling through a soft formation, a plug of a non-conventional cement is set across the zone in order to achieve the desired course and target. The non-conventional cement is preferably blast furnace slag and a water base drilling fluid.

5 Claims, No Drawings

U.S. PATENT DOCUMENTS

| | | | |
|---|---|---|---|
| 4,643,617 | 2/1987 | Kanno et al. | 405/222 |
| 4,664,843 | 5/1987 | Burba, III et al. | |
| 4,668,128 | 5/1987 | Hartley et al. | |
| 4,674,574 | 6/1987 | Savoly et al. | 166/293 |
| 4,690,589 | 9/1987 | Owa | 405/263 |
| 4,692,065 | 9/1987 | Suzuki et al. | 405/211 |
| 4,720,214 | 1/1988 | Brasted et al. | |
| 4,746,245 | 5/1988 | Mork | 405/224 |
| 4,760,882 | 8/1988 | Novak | |
| 4,761,183 | 8/1988 | Clarke | |
| 4,790,954 | 12/1988 | Burba, III et al. | |
| 4,880,468 | 11/1989 | Bowlin et al. | |
| 4,897,119 | 1/1990 | Clarke | |
| 4,913,585 | 4/1990 | Thompson et al. | |
| 4,942,929 | 7/1990 | Malachosky et al. | |
| 4,991,668 | 2/1991 | Rehm et al. | |
| 5,016,711 | 5/1991 | Cowan | |
| 5,020,598 | 6/1991 | Cowan et al. | 166/293 |
| 5,026,215 | 6/1991 | Clarke | |
| 5,058,679 | 10/1991 | Hale et al. | |
| 5,082,499 | 1/1992 | Shen | 106/735 |
| 5,086,850 | 2/1992 | Harris et al. | |
| 5,105,885 | 4/1992 | Bray et al. | |
| 5,106,423 | 4/1992 | Clarke | |
| 5,121,795 | 6/1992 | Ewert et al. | |
| 5,123,487 | 6/1992 | Harris et al. | |
| 5,125,455 | 6/1992 | Harris et al. | |
| 5,127,473 | 7/1992 | Harris et al. | |
| 5,133,806 | 7/1992 | Sakamoto et al. | 106/811 |
| 5,147,565 | 9/1992 | Bour et al. | 252/8.551 |

DIRECTIONAL DRILLING PLUG

BACKGROUND OF THE INVENTION

1. Field of the Invention

This invention relates to the use of cement plugs in a well, particularly an oil or gas well, and particularly to achieve directional drilling.

2. Background of the Invention

A cement plug is a relatively small volume of cement slurry placed in a wellbore for various purposes At some time in the life of an oil or gas well, a cement plug may be required, either to correct some problem, or to facilitate some operation.

During directional drilling operations, it may be difficult to achieve the correct angle and direction when drilling through a soft formation. A cement plug can be set across the zone in order to achieve the desired course and target.

Setting cement plugs has several potential problems particularly where high strength and good adhesion to the borehole wall are needed in order to have a suitable plug. First, contamination of the cement slurry with a drilling fluid generally alters the setting time and compressive strength of the cement formulation. Most water based drilling fluids increase the setting time requiring a longer waiting period for the resumption of drilling operations since compressive strength development is delayed. Oil invert emulsion drilling fluids (oil muds) typically have a high calcium chloride brine internal liquid phase which can significantly reduce the setting time and strength of the Portland cement. Contact with any brine in the drilling fluid or in the well will reduce the strength of Portland cement.

Second, contamination of Portland cement with the drilling fluid is highly probable due to the process used to place the cement plug in the borehole. A successive displacement process is used wherein the cement slurry is pumped down the drill string (or similar work string with an inner diameter substantially smaller than the diameter of the borehole). The slurry is then displaced out the bottom of the drill string into the annulus between the borehole and drill string by pumping a second (displacing) fluid down the drill string. This displacing fluid is typically drilling fluid.

The borehole is filled with drilling fluid and the cement slurry exiting the bottom of the drill string is traveling at a higher velocity than the fluid moving up the much larger annular space. Thus the cement slurry is "jetted" into the drilling fluid as its flow direction changes 180 degrees. Any chemical incompatibility between the drilling fluid and cement slurry may produce a gelled mass that inhibits effective displacement of the drilling fluid by the Portland cement slurry which can result in contamination of the entire cement volume.

Spacers are often used ahead of the Portland cement slurry to prevent contamination of the cement with the drilling fluid. These spacers are similar in composition to the drilling fluid. Clay and/or polymeric thickeners are used to viscosity the base fluid (usually water) in order to suspend weighting agents such as barites, hematites, or ilmenite. Emulsions of oil and water may also be used to provide viscosity for solids suspension. Often, surfactants and/or other solvents may be incorporated into the spacer to improve compatibility with the drilling fluid. Although more chemically compatible with the cement, spacer contamination of the cement slurry can occur and the effect on cement compressive strength is often similar to the effect of drilling fluid contamination.

Third, the cement must adhere to the borehole walls to prevent downward movement of the plug when weight is applied during the drilling operation. This adhesion is typically referred to as the shear bond strength of the cement. Coatings on the surfaces of the formation can reduce the shear bond of the cement. The borehole wall is typically coated with a drilling fluid filter cake which was deposited when the formation was penetrated by the initial drilling operation. This drilling fluid filter cake has low strength and may be sheared off the borehole wall by downward movement of the cement plug during drilling. Drilling may be aggravated by the thickness of the filter cake and any bypassed drilling fluid left in sections of the annulus. Also, any coating of the spacer along the borehole wall may reduce the shear bond strength between the borehole wall and the cement plug.

The density of many materials used for plugs is greater than the drilling fluid density. The primary reason for this is higher compressive strength and greater drilling resistance. For Portland cement plugs, lower water to cement ratios are required to provide greater strength. Greater strength often is used to offset the potential strength reduction due to contamination by the drilling fluid. The disadvantage of high density formulations is the possibility of the plug falling through the drilling fluid below the interval where the plug is desired. The density differential between the drilling fluid and Portland cement increases the probability that an unstable interface will result between the cement and drilling fluid. If the interface between fluids is unstable, cement and drilling fluid can mix causing a poor quality plug.

Accordingly, the present invention is directed to overcoming the above noted problems with Portland cement in the art, and in particular to problems experienced with effective directional drilling cement plugs in oil and gas wells.

SUMMARY OF THE INVENTION

It is the primary purpose of the present invention to provide a method for changing the direction of drilling of a wellbore, using a cement plug.

Accordingly, a method is provided for directionally drilling a well, comprising:

Preparing a cementitious slurry comprising:

(a) a cementitious component selected from blast furnace slag and a proton acceptor metal compound; and (b) an activator wherein, when said cementitious component is said blast furnace slag, said activator is optionally an alkaline agent, and when cementitious component is said metal compound, said activator is a phosphorus acid or one of a polymer component of the formula:

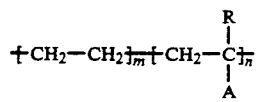

wherein A is

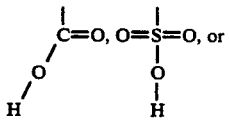

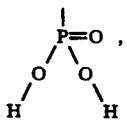

or a mixture of

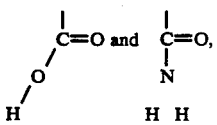

and wherein R is H or a 1-10 carbon atom alkyl radial and the ratio of m to n is within the range of 0:1 to 100:1; and (c) a water source selected from water, brine, seawater, water base drilling fluid, and water emulsion drilling fluid;

displacing the slurry in the wellbore to a location therein where said direction of drilling is to be changed;

allowing the slurry to solidify and form a plug;

drilling a pilot hole in said plug in the desired new direction of drilling; and continuing the direction of drilling of said well bore by way of said pilot hole in said cement plug.

Other purposes, distinctions over the art, advantages and features of the invention will be apparent to one skilled in the art upon review of the following.

DESCRIPTION OF PREFERRED EMBODIMENTS

The following preferred embodiments of the invention explain the principles of the invention.

The present invention provides a unique method devised to provide a directional drilling cement plugs in vertical, deviated, and horizontal wells. The invention centers around the solidification of non-conventional cement plugs preparatory to changing direction of drilling.

The present invention provides an improved process for plugging a section of an existing borehole with a non-conventional cement, the cement being resistant to drilling fluid contamination, having better adhesion to the filter cake along the borehole wall and being more compatible with the drilling fluid in the wellbore. The non-conventional cementitious slurry of this invention is more rheologically and chemically compatible with the drilling fluid than is a cement conventionally applied in forming directional drilling plugs. Thus, the invention encompasses embodiments in which no spacers are used ahead of the cementitious slurry to prevent commingling with the drilling fluid. In such embodiments, the non-conventional cementitious slurry is placed in direct contact with the drilling fluid, eliminating the need for problem-causing chemical spacers which are preferred for placement of Portland cement plugs, as discussed supra.

In the drilling of a well bore, it is often desirable or necessary to change the direction of the well bore. The angle of the well bore from vertical can be increased or decreased by adjusting drilling conditions, such as the weight exerted on the drill bit or the rotary speed of the drill bit; or special tools designed specifically to effect a change in well bore direction can be used.

Certain formations cause the drill bit to drill in a particular direction. If that direction is away from vertical in a vertical well, undesirable well bore deviation can result. In a directional well which is purposely drilled at an angle after drilling an initial portion of the well bore vertically, the direction induced by the formation can make following the desired path difficult. In those and other instances, special directional drilling tools are often used such as a whip-stock, a bent sub-downhole motorized drill combination, and the like. Generally, the directional drilling tool or tools used are orientated so that a pilot hole is produced at the desired angle to the previous well bore in a desired direction. When the pilot hole has been drilled for a short distance, the special tool or tools are removed, if required, and drilling along the new path is resumed.

In order to insure that the subsequent drilling follows the pilot hole, it is often necessary to drill the pilot hole in a cement plug placed in the well bore. That is, prior to drilling the pilot hole, a cement slurry is pumped into the well bore and allowed to set therein. The pilot hole is then drilled in the cement plug formed in the well bore, and the high strength of the cement plug insures that the subsequent drilling proceeds in the direction of the pilot hole. While this procedure is generally successful in insuring that the drilling follows the desired path, the cement slurries heretofore used lack strength and good bonding to the borehole.

Drilling of the borehole is preferably conducted with a universal fluid, which is a drilling fluid, containing the non-conventional cementitious slurry. This results in a settable filter cake being deposited on the borehole wall. The settable filter cake furnishes an excellent means for bonding the plug to the borehole in order to effectively seal the thief zone.

Cementing of the well is preferably conducted by adding the non-conventional slurry to the universal fluid. This results in a cement which readily bonds to the settable filler cake. Of course it is manifest that drilling and cementing may be conducted with conventional fluids known to the art which work well with the non-conventional cement plugs of this invention.

In this description the term 'cementitious component' means either an hydraulic material which on contact with water and/or activators hardens or sets into a solidified composition or a component which, on contact with a reactive second component, sets or hardens into a solidified composition. Thus, broadly it can be viewed as a material which can chemically combine to form a cement. A slurry of the cementitious component and the component or components which cause it to harden is referred to herein as a cementitious slurry.

The initial drilling fluid or mud can be either a conventional drilling fluid, i.e., one not containing a cementitious component, or it can be one already containing a cementitious component in a relatively small amount. The drilling fluid can be either a water-based fluid or an oil-based fluid. The term 'water-based fluid' is intended to encompass both fresh water muds, salt water containing muds, whether made from seawater or brine, and other muds having water as the continuous phase including oil-in-water emulsions. It is generally preferred that the water-based drilling fluids use water containing dissolved salts, particularly sodium chloride. In these instances, 0.1 to saturation sodium chloride may be used. One suitable source is to use seawater or a brine solution simulating seawater. Particularly in the embodiment using slag, the strength of the resulting cement is actually enhanced which is contrary to what would be expected in view of the intolerance of Portland cement to brine. Various salts, preferably organic salts, are suitable for use in the drilling fluid used in this invention in addition to, or instead of NaCl, including, but not limited to, NaBr, KCl, $CaCl_2$, $NaNO_3$, $NaC_2H_3O_2$, $KC_2H_4O_2$, $NaCHO_2$ and $KCHO_2$ among which sodium chloride is preferred, as noted above. The term 'oil-based fluids' is meant to cover fluids having oil as the continuous phase, including low water content oil-base mud and invert oil-emulsion mud.

The term 'universal fluid' is used herein to designate those compositions containing cementitious material, which compositions are suitable for use as a drilling fluid, and which compositions thereafter, for the purpose of practicing this invention, have additional cementitious material and/or activators such as accelerators (or reactive second components) added to give a cementitious slurry.

Thus, with the universal fluid embodiment of this invention, the purpose of one aspect of the invention is achieved through a method for drilling and cementing a well comprising preparing a universal fluid by mixing a drilling fluid and a cementitious material; drilling a borehole with the universal fluid and laying down a settable filter cake on the walls of the borehole during drilling of the well; diluting the drilling fluid; adding additional cementitious material and/or accelerators (or reactive second components) and introducing the thus-formed cementitious slurry into the wellbore and into an annulus between the wellbore and a casing where it hardens and sets up forming a good bond with the filter cake which filter cake, with time, actually hardens itself because of the presence of cementitious material therein. This hardening is facilitated by any accelerators which may be present in the cementitious slurry and which migrate by diffusion and/or filtration into the filter cake.

Non-Conventional Cements

The cementitious component can be any one or more of: conventional hydraulic cement, natural or artificial pozzolan, or the metal compound used to produce an ionomer or to produce a phosphorus salt. The preferred cementitious material is one selected from the group consisting of blast furnace slag, a metal oxide component used to produce the ionomer and a metal oxide component used to produce the phosphorus salt. By 'blast furnace slag' is meant the hydraulic refuse from the melting of metals or reduction of ores in a furnace as disclosed in Hale and Cowan, U.S. Pat. No. 5,058,679 (Oct. 22, 1991), the disclosure of which is hereby incorporated by reference. By ,phosphorus salt, is meant a phosphonate, a phosphate or a polyphosphate as is described in detail hereinafter.

The preferred blast furnace slag used in this invention is a high glass content slag produced by quickly quenching a molten stream of slag at a temperature of between 1400° C. and 1600° C. through intimate contact with large volumes of water. Quenching converts the stream into a material in a glassy state having hydraulic properties. At this stage it is generally a granular material that can be easily ground to the desired degree of fineness. Silicon dioxides, aluminum oxides, iron oxides, calcium oxide, magnesium oxide, sodium oxide, potassium oxide, and sulphur are some of the chemical components in slags. Preferably, the blast furnace slag used in this invention has a particle size such that it exhibits a surface area between 500 $cm^2/g$ and 15,000 $cm^2/g$ and more preferably, between 3,000 $cm^2/g$ and 15,000 $cm^2/g$, even more preferably, between 4,000 $cm^2/g$ and 9,000 $cm^2/g$, most preferably between 4,000 $cm^2/g$ and 8,500 $cm^2/g$. An available blast furnace slag which fulfills these requirements is marketed under the trade name "NEWCEM" by the Blue Circle Atlantic Company. This slag is obtained from the Bethlehem Steel Corporation blast furnace at Sparrow's Point, Md.

A usual blast furnace slag composition range in weight percent is: $SiO_2$, 30–40; $Al_2O_3$, 8–18; CaO, 35–50; MgO, 0–15; FeO, 0–1; S, 0–2 and $Mn_2O_3$, 0–2. A typical specific example is: $SiO_2$, 36.4; $Al_2O_3$, 16.0; CaO, 43.3; MgO, 3.5; FeO, 0.3; S, 0.5; and $MnO_2O_3 < 0.1$.

Blast furnace slag having relatively small particle size is frequently desirable because of the greater strength it imparts in many instances to a final cement. Characterized in terms of particle size the term "fine" can be used to describe particles in the range of 4,000 to 7,000 $cm^2/g$. Corresponding to 16 to 3 microns in size; "microfine" can be used to describe those particles in the 7,000 to 10,000 $cm^2/g$ range that correspond to particles of 5.5–16 microns in size and "ultrafine" can be used to describe particles over 10,000 $cm^2/g$ that correspond to particles 5.5 microns and smaller in size.

However, it is very time consuming to grind blast furnace slag to these particles sizes. It is not possible to grind blast furnace slag in a manner where particles are entirely once size. Thus, any grinding operation will give a polydispersed particle size distribution. A plot of particle size versus percent of particles having that size would thus give a curve showing the particle size distribution.

In accordance with a preferred embodiment of this invention a blast furnace slag having a polydispersed particle size distribution exhibiting at least two nodes on a plot of particle size versus percent of particles in that size is utilized. It has been found that if only a portion of the particles are in the ultrafine category, the remaining, indeed the majority, of the slag can be ground more coarsely and still give essentially the same result as is obtained from the more expensive grinding of all of the blast furnace slag to an ultrafine state. Thus, a grinding process which will give at least 5% of its particles falling within a size range of 1.9 to 5.5 microns offers a particular advantage in economy and effectiveness. More preferably, 6 to 25wt% would fall within the 1.9 to 5.5 micron range. The most straightforward way of obtaining such a composition is simply to grind a minor portion of the blast furnace slag to an ultrafine condition and mix the resulting powder with slag ground under less severe conditions. Even with the less severe conditions there would be some particles within the fine, microfine or ultrafine range. Thus, only a minority, i.e., as little as 4wt% of the slag, would need to be ground to the ultrafine particle size Generally, 5 to 20wt%, more preferably 5 to 8wt% can be ground to the ultrafine particle size and the remainder ground in a normal way thus giving particles generally in a size range of greater than 11 microns, the majority being in the 11 to 31 micron range.

By ionomer is meant organometal compositions having a metal attached to or interlocking (crosslinking) a polymer chain. Suitable polymer components of such ionomers can be represented by the formula

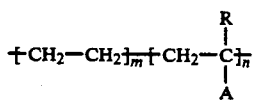

wherein A is

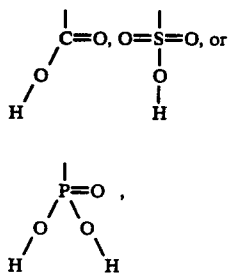

or a mixture of

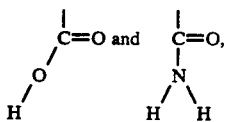

and wherein R is H or a 1–10 carbon atom alkyl radical. The ratio of m to n is generally within the range of 0:1 to 100:1, preferably 0.1:1 to 10:1.

The polymers generally have a ratio of functional groups to polymer chain carbons within the range of 1:2 to 1:10, preferably about 1:3. Thus, if m and n are 1, R is H and A is carboxylate, there would be a ratio of carboxylic carbons (1) to polymer chain carbons (4) of 1:4. The polymer can also be a polycarboxylic acid polymer. One of the more preferred polymers is that made from partially hydrolyzed polyacrylamide. The hydrolysis can vary from 1% up to 100% and preferably from 10% to 50%, most preferably from 25% to 40%. The molecular weight of the polymers can vary widely so long as the polymers are either water-soluble or water-dispersable. The weight average molecular weights can range from 1000 to 1,000,000 but preferably will be in the range of 1,000 to 250,000, most preferably 10,000 to 100,000. Carboxylate polymer with a low ratio of COOH:C within the range of 1:3 to 2:5 are preferred. Especially preferred is a carboxylic acid polymer having a ratio of carboxylic carbons to polymer chain carbons (including carbons of pendant chains) of about 1:3 and a molecular weight within the range of 10,000 to 100,000. Partially hydrolyzed polyacrylamide polymers in the range of 5,000–15,000,000 molecular weight are suitable. The copolymers will generally have from 2–99, preferably 5–80, more preferably 10–60 mole percent acid-containing units.

The ionomers suitable for use in this invention are the water-insoluble reaction product of a proton acceptor metal compound which serves as the cementitious component and a carboxylic, sulfonic, or phosphonic acid polymer component. The metal compound generally is a metal oxide such as MgO or ZnO. The preferred metal oxides are magnesium oxide and zinc oxide, and most preferably, magnesium oxide. The applicable metal oxides are generally fired at temperatures above 1,000° F for several hours to reduce chemical activity prior to grinding to final particle size for use in reacting with the acid component.

In instances where it is desired that the metal compound component add weight to the drilling fluid, the metal compound is preferably a water-insoluble metal compound with a specific gravity of at least 3.0, preferably 3.5. By 'insoluble' is meant that less than 0.01 parts by weight dissolve in 100 parts by weight of cold (room temperature) water.

The poly(carboxylic acid) component can be any water soluble or water dispersable carboxylic acid polymer which will form ionomers. Ionomer forming polymers are well known in the art. Suitable polymers include poly(acrylic acid) poly(methacrylic acid), poly(ethacrylic acid), poly(fumaric acid), poly(maleic acid), poly(itaconic acid) and copolymers such as ethylene/acrylic acid copolymer and ethylene/methacrylic acid copolymer. The copolymers are generally random copolymers. An example of phosphonic acid polymers is poly(vinyl phosphonic acid) which is made from vinyl phosphonic acid,

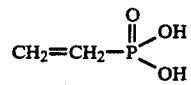

Suitable copolymers containing vinyl phosphonic acid include vinyl phosphonic acid/acrylic acid copolymer as well as copolymers with other unsaturated monomers, with or without a functional group.

In some instances, it is preferred to use water dispersable, as opposed to water soluble, polymers. Ideally, in such instances the melting point of the polymer should be higher than the placement temperature (circulating temperature) in the wellbore during the "cementing" operation and lower than the maximum, static temperature of the surrounding formations. It is desirable for the polymer to melt and react after placement as the temperature in the wellbore increases from the circulating temperature to the static temperature of the surrounding formations.

The amount of polymer utilized will vary widely depending upon the carboxylic acid content of the polymer; broadly, 10 to 200, preferably 10 to 100, most preferably 10 to 80wt%, based on the weight of metal compound, can be present. With the polymers having a low ratio of m to n, a smaller amount is required because of the higher functional group content of the polymer. Conversely, with the high ratio of m to n, an amount of polymer toward the higher end of the ranges is preferred. Polymers with ester groups will delay the setting of the cement where this is desired.

Phosphates and phosphonates, referred to herein as phosphorus salts, used in accordance with this invention also are produced from a two-component composition, the first component of which is a metal compound identical in scope to that used in the ionomers as described hereinabove so long as the resulting phosphorus salt is insoluble in water. Most preferred are MgO and Zno.

The second component is a phosphonic or phosphoric acid, preferably a polyphosphoric acid. The term 'phosphoric acid' is meant to encompass both linear and cyclic polyphosphoric acids. These second component acids are referred to herein as phosphorus acids. Linear phosphoric acids can be depicted by the general formula $H_{n+2}P_nO_{3n+1}$ where n is 1–100, preferably 2 to 50, more preferably, 2 to 20. Examples include di-(pyro)phosphoric acid, tri-(tripoly)phosphoric acid, tetra-phosphoric acid and higher molecular weight polyphosphoric acids as well as phosphoric acid. Mixtures of acids, including those traditionally referred to as meta phosphoric acid, are particularly suitable for use in this invention.

The formation of one phosphate cement using a metal oxide as the metal compound can be depicted as follows:

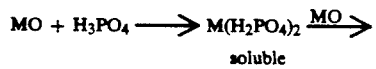
soluble

less soluble    insoluble(cement)

where:
X is usually 4; and
MO=metal oxide which is amphoteric or is a proton acceptor.

With the ionomers, and the phosphorus salts when made with a polyvalent metal compound, a crosslinked network structure exists as a result of the addition of the second component, thus giving a very strong solid cement.

The particle size of the metal compound component can vary widely. Generally, it will be within the range such that the powder exhibits a surface area within the range of 500 cm$^2$/g to 30,000 cm$^2$/g, preferably 1,500 cm$^2$/g to 25,000 cm$^2$/g, most preferably 2,000 cm$^2$/g to 20,000 cm$^2$/g.

Because of the mass provided by the metal compound component of the ionomer or the polyphosphorus salt, these cementitious materials are generally actually heavier than most slag or Portland cement materials. In the embodiments using these cementitious materials this high density provides significant advantages in certain utilities. For one thing, a smaller amount of the material can be used and still achieve a final mud and ultimately cement of a desired density. Secondly, because of the high density, it is possible to operate without weighting agents such as barium sulfate or barite. They offer a further advantage in that they do not set up until the second component is added.

The metal compound of the ionomer or phosphorus salt can be used as the sole cementitious material or can be used in admixture with siliceous hydraulic materials such as the blast furnace slag or Portland cement. In one embodiment an hydraulic component such as slag can be used to give the metal ion component of the ionomer or phosphate to give, in effect, a mixture formed in situ.

Preferably, when the ionomer or phosphorus salt is utilized, the metal compound is added first and thereafter at such time as it is desired for the cement to be activated to set, the other component is added. In the case of the universal fluids, a portion of the total metal compound can be added to the drilling fluid, the remainder being added after dilution when the cementitious slurry is being formed. Boric acid, borate salts, and aluminates such as sodium aluminate will delay the setting of the phosphate cement. Amounts of 1 to 100% by weight of the retarder may be used, based on the weight of the phosphorus acid.

A typical mud formulation to which cementitious material may be added to form drilling fluid is as follows: 10-20 wt% salt (70,000-140,000 mg/l), 8-10 lbs/bbl bentonite, 4-6 lbs/bbl carboxymethylated starch (fluid loss preventor), sold under the trade name "BIOLOSE" by Milpark, 0.5-1 lbs/bbl partially hydrolyzed polyacrylamide (PHPA) which is a shale stabilizer, sold under the trade name "NEWDRIL" by Milpark, 1-1.25 lbs/bbl CMC sold under the trade name "MILPAC" by Milpark, 30-70 lbs/bbl drill solids, and 0-250 lbs/bbl barite.

The sequence for universal fluid in this embodiment of the invention is to prepare the drilling fluid containing a portion of the total metal compound to be utilized, carry out the drilling operation, dilute the fluid, add the remainder of the metal compound, and thereafter add the acid components and utilize the cement for its intended purpose such as cementing a casing.

In accordance with the invention that utilizes universal fluid, the fluid itself becomes a part of the final cement and thus, this portion of the drilling fluid does not need to be disposed of.

In all embodiments of the invention, additional cement can be made and used, in accordance with this invention, for remedial cementing.

The ionomer embodiments of this invention are of particular value for filling and sealing the annulus between a borehole wall and a casing, or between casings, particularly where some degree of ductility and/or tensile strength is desired. The ionomer has good adhesive properties to the borehole wall and casing and has greater elasticity than is obtained with siliceous hydraulic materials such as Portland cement. Thus, such cements are resistant to cracking under conditions of cyclic loading as are frequently encountered in a wellbore. For similar reasons the ionomer embodiment of the invention is beneficial in cementing liners and tieback casing strings which may otherwise leak due to changes in pressure and temperature in the well during production operations. Another area where the ductility of the ionomer cement is of special value is in slimhole wells where the annulus is smaller. Still yet another area where this ductility is important is in extended reach drilling. The term 'extended reach' is intended to cover horizontal drilling and any other well drilling operations which are off-vertical a sufficient amount to cause the casing to be displaced by gravity toward one side of the borehole.

As noted hereinabove the initial drilling fluid ca be either a conventional drilling fluid or it can be a universal fluid which already has cementitious material therein.

Dilution

In all embodiments, the amount of dilution can vary widely depending on the desired application. Generally, the fluid will be diluted with from 5 to 200, preferably 5 to 100%, more preferably 5 to 50% volumes of liquid (water in the case of a water-based fluid) per volume of initial drilling fluid. In one particularly preferred embodiment, the dilution is such that on addition of the cementitious component (or in the case of the universal fluid addition of the remaining cementitious component) the final density will be within the range of 30% less to 70% more than the original density, preferably within the range of 15% less to 25% more, most preferably, essentially the same, i.e., varying by no more than ±5 wt%. This is particularly valuable in an operation where there is a narrow pressure window between the pressure needed to prevent blowout and the pressure which would rupture or fracture the formation through which drilling has taken place.

The dilution fluid can be the same or different from that used to make the drilling fluid in the first place. In the case of brine-containing fluids the dilution fluid will generally be brine also. This is of particular benefit in offshore drilling operations where fresh water is not readily available but brine is since seawater is a desirable brine.

Thus, as noted above, a significant improvement in the operating procedure is provided in accordance with this invention. This is because the density of the drilling fluid is frequently tailored to the characteristics of the formation through which the wellbore is being drilled. Thus, the density is chosen in the first place to be sufficient to avoid inflow into the wellbore because of formation pressure but is further chosen to be insufficient to rupture or fracture the borehole wall and force the fluid out into the formation. By utilizing the dilution and thereafter addition of the cementitious component (or in the case of universal fluid, the remainder of the cementitious component) the cementitious slurry can likewise have a density tailored to the particular operation. In addition, this avoids undue thickening of the drilling fluid as would occur, particularly with some hydraulic components, without the dilution and thus the rheological properties of the cementitious slurry and the drilling fluid can both be tailored for optimum performance.

The invention (dilution of a drilling fluid and thereafter adding cementitious material to produce a cementitious slurry) offers special advantages with certain cementitious components in addition to the general benefits such as reduced equipment needs. With Portland cement it avoids the extraordinary viscosity increase that adding such an hydraulic material to a drilling fluid would give. With slag, organometals and polyphosphates there is the advantage that the cementitious component has a drilling fluid function. With the ionomers and polyphosphates there is the further general advantage that unlimited time can elapse between the drilling and cementing operations with no loss of properties of either because these materials do not begin to set until the second component is added.

The dilution can be carried out in either of two ways. First, a vessel containing drilling fluid can simply be isolated and the desired amount of water or other diluent added thereto. In a preferred embodiment, however, the drilling fluid is passed to a mixing zone as a flowing stream and the dilution fluid added "on the fly" to the flowing stream. Thereafter, the additional blast furnace slag is added. This avoids highly viscous cementitious slurry compositions and allows all of the pumping to be done with piping and pumps associated with the well rig without the need for pumps designed for pumping cement. This is of particular value in the areas to which this invention is of special utility, offshore drilling rigs where the transportation of additional pumping equipment is particularly inconvenient. Thus, it is possible to tailor the final density of the cementitious slurry, if desired, to a value within the range of 30% less to 70% more than the original density of the drilling fluid, preferably within the range of 15% less to 50% more, most preferably essentially the same, i.e., varying by no more than ±5 weight percent.

Mixed metal hydroxides can be used in the drilling fluid to impart thixotropic properties. The mixed metal hydroxides provide better solids suspension. This, in combination with the settable filter cake provided in the technique of this invention, greatly enhances the cementing in a restricted annulus. The mixed metal hydroxides are particularly effective in muds containing clay such as sodium bentonite. Preferred systems thickened in this way contain from 1–20 lbs/bbl of clay such as bentonite, preferably 2 to 15 lbs/bbl, most preferably 7 to 12 lbs/bbl. The mixed metal hydroxides are generally present in an amount within the range of 0.1 to 2 lbs/bbl of total drilling fluid, preferably 0.1 to 1.5 lbs/bbl, most preferably 0.7 to 1.2 lbs/bbl. Mixed metal hydroxides are known in the art and are trivalent metal hydroxide-containing compositions such as $MgAl(OH)_{4.7}Cl_{0.3}$. They conform essentially to the formula $$Li_m D_d T(OH)_{(m+2d+3+na)} A'_a{}^n$$

where

M represents the number of Li ions present; the said amount being in the range of zero to about 1;

D represents divalent metals ions; with
d representing the amount of D ions in the range of zero to about 4;
T represents trivalent metal ions;
A' represents monovalent or polyvalent anions of valence -n, other than OH—, with a being the amount of A' anions; and where (m+2d+3+na) is equal to or greater than 3. A more detailed description can be found in Burba, U.S. Pat. No. 4,664,843 (May 12, 1987). The mixed metal hydroxides in the drilling fluid, in combination with blast furnace slag, tend to set to a cement having considerable strength in a comparatively short time, i.e., about one-half hour at temperatures as low as 100° F. This can be a major asset in some applications. In such instances, a thinner such as a lignosulfate is preferably added before adding slag. However, one of the advantages of this invention is that it reduces or eliminates the need for additives to control free water or solids suspension. The activator or activators can be added either with any other ingredients that are added before the additional blast furnace slag, with the additional blast furnace slag, or after the addition of the additional blast furnace slag.

In some instances, it may be desirable to use a material which functions as a retarder along with the activator because of the need for other effects brought about by the retarder. For instance, a chromium lignosulfonate may be used as a thinner along with the activator even though it also functions as a retarder.

Other suitable thinners include chrome-free lignosulfonate, lignite, sulfonated lignite, sulfonated styrene maleic-anhydride, sulfomethylated humic acid, naphthalene sulfonate, a blend of polyacrylate and polymethacrylate, an acrylamideacrylic acid copolymer, a phenol sulfonate, a naphthalene sulfonate, dodecylbenzene sulfonate, and mixtures thereof.

In one embodiment the drilling fluid consists essentially of slag and seawater and is pumped exclusively using the piping and pumps associated with the drilling rig without the need for any pumps designed for pumping cement.

In the case of hydraulic materials, particularly the more preferred hydraulic material, blast furnace slag, the amount of hydraulic material present in the universal fluid is generally within the range of 1 to 100 lbs/bbl of final drilling fluid, preferably 10 to 80 lbs/bbl, most preferably 20 to 50 lbs/bbl. In the case of the organometals (ionomers) or phosphorus salts the amount of metal compound initially present in universal fluid can also vary widely. Generally, 1 to 500 lbs/bbl, preferably 50 to 300 lbs/bbl, most preferably 100 to 250 lbs/bbl of the metal compound are used.

The total amount of cementitious material in the cementitious slurry will typically range from about 20 lbs/bbl to about 600 lbs/bbl, preferably 100 lbs/bbl to 500 lbs/bbl, most preferably 150 lbs/bbl to 350 lbs/bbl. This can be adjusted to give the desired density as noted hereinabove.

Reference herein to additives encompasses both the specialized additives necessary for this invention such as the carboxylic acid polymer in the case of the ionomer or the polyphosphoric acid in the case of the polyphosphate as well as conventional additives.

Conventional Drilling Fluid Additives

Suitable fluid loss additives found in drilling fluids include bentonite clay, carboxymethylated starches, starches, carboxymethyl cellulose, synthetic resins such as "POLYDRILL" by SKW Chemicals, sulfonated lignite, lignites, lignin, or tannin compounds. Weight materials include barite, calcium carbonate, hematite and MgO, for example. Shale stabilizers that are used in drilling fluids include hydrolyzed polyacrylonitrile, partially hydrolyzed polyacrylamide, salts including NaCl, KCl, sodium or potassium formate, sodium or potassium acetate, polyethers and polycyclic and/or polyalcohols. Viscosifying additives can be used such as biopolymers, starches, attapulgite and sepiolite. Additives are also used to reduce torque. Suitable thinners such as chrome and chrome free lignosulfonates, sulfonated styrene maleic-anhydride and polyacrylate may also be used depending upon the mud type and mud weight. Lubricating additives include nonionic detergents and oil (diesel, mineral oil, vegetable oil, synthetic oil), for instance. Alkalinity control can be obtained with KOH, NaOH or CaO, for instance. In addition, other additives such as corrosion inhibitors, nut hulls etc. may be found in a typical drilling fluid. Of course, drill solids including such minerals as quartz and clay minerals (smectite, illite, chlorite, kaolinite, etc.) may be found in a typical mud.

It is particularly desirable in accordance with a further embodiment of this invention to utilize silica to increase the temperature resistance of the final cement. The use of blast furnace slag as the hydraulic component, in itself, allows greater latitude in the temperature which can be tolerated, because the blast furnace slag is inherently less thermally sensitive than other known hydraulic components such as Portland cement and thus can be hardened over a wider range of temperatures without resort to additives. This is of particular advantage where there is a substantial temperature gradient from the top to the bottom of a borehole section to be cemented. However, with the addition of silica, further temperature resistance may be imparted to the cement after it is set. Thus, with blast furnace slag and silica a temperature resistant cement is possible and with other cementitious components the temperature range can be extended through the used silica. Suitable silicas include crystalline silicas such as alpha quartz.

Universal Fluids

In another embodiment of this invention, most or all of the components of the drilling fluid are chosen such that they have a function in the cementitious material also. The following Table illustrates the uniqueness of such formulations.

TABLE A

| | Function | | | |
|---|---|---|---|---|
| | Drilling Fluid | | Cementitious Slurry | |
| Additive | Primary | Secondary | Primary | Secondary |
| Synthetic polymer[1] | Fluid loss control | | Fluid loss control | Retarder |
| Starch[2] | Fluid loss control | Viscosity | Fluid loss control | Retarder |
| Bio-polymer[3] | Viscosity | | Viscosity | Retarder |
| Silicate | Viscosity | Shale stabilizer | Accelerator | — |
| Carbohydrate polymer[4] | Deflocculant | — | Retarder | Deflocculant |
| Barite[5] | Density | — | Density concentration | Solids |
| Bentonite[6] | Fluid loss control | — | Fluid loss control | Solids concentr. |
| Clay/Quartz dust[7] | — | — | Solids concentration | — |
| Slag[8] | Cuttings stabilizer | — | Cementitious concentration | Solids |
| Lime[9] | Cuttings/Wellbore stabilizer | Alkalinity | Accelerator concentration | Solids |
| PECP[10] | Shale stabilizer | Fluid loss | Retarder | Rheological Control |
| NaCl | Shale stabilizer | — | — | — |

[1]Polydrill, A synthetic polymer manufactured by SKW Chemicals Inc. under trade name Polydrill, for instance.
[2]Starch made by Milpark Inc. under the trade name "PERMALOSE", for instance.
[3]A biopolymer made by Kelco Oil Field Group, Inc., under the trade name "BIOZAN" for instance.
[4]Water-soluble carbohydrate polymer manufactured by Grain Processing Co. under trade name "MOR-REX".
[5]Barite is BaSO$_4$, a drilling fluid weighting agent.
[6]Bentonite is clay or colloidal clay thickening agent.
[7]Clay/quartz solid dust manufactured by MilWhite Corp. under the trade name "REVDUST", for instance.
[8]Blast furnace slag manufactured by Blue Circle Cement Co. under the trade name "NEWCEM" is suitable.
[9]CaO
[10]Polycyclicpolyetherpolyol The material in the above Table A labeled PECP is of special significance in connection with this invention. This refers to a polyhydric alcohol most preferably a polycyclicpolyetherpolyol. A general chemical composition formula representative of one class of these materials is as follows:

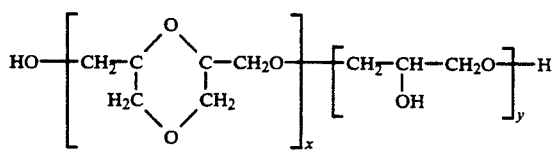

where $x \geq 1$ and $y \geq 0$.

A more complete description of these polycyclicpolyetherpolyols is found in the Hale and Cowan patent, U.S. Pat. No. 5,058,679 (Oct. 22, 1991), referred to hereinabove, the disclosure of which is incorporated herein by reference.

Universal drilling fluids which utilize blast furnace slag can be subsequently activated to cause the drilling fluid to develop compressive strength with time.

Suitable activators include sodium silicate, sodium fluoride, sodium silicofluoride, magnesium silicofluoride, magnesium hydroxide, magnesium oxide, zinc silicofluoride, zinc oxide, zinc carbonate, titanium carbonate, sodium carbonate, potassium sulfate, potassium nitrate, potassium nitrite, potassium carbonate, sodium hydroxide, potassium hydroxide, copper sulfate, lithium hydroxide, lithium carbonate, calcium oxide, calcium sulfate, calcium nitrate, calcium nitrite, calcium hydroxide, sodium sulfate and mixtures thereof. A mixture of caustic soda (sodium hydroxide) and soda ash (sodium carbonate) is preferred because of the effectiveness and ready availability. When mixtures of alkaline agents such as caustic soda and soda ash are used the ratio can vary rather widely since each will function as an accelerator alone. Preferably, about 1 to 20 lbs/bbl of caustic soda, more preferably 2 to 6 lbs/bbl of caustic soda are used in conjunction with from 2 to 50 lbs/bbl, preferably 2 to 20 lbs/bbl of soda ash. The references to "lbs/bbl" means pounds per barrel of final cementitious slurry.

A combination of sodium hydroxide and sodium carbonate is preferred. In addition, blast furnace slag can be added between the use of this material as a drilling fluid and its use as a cement. The additional slag can be the activator, especially if heat is imparted to the operation. Each component is an important ingredient for both the drilling fluid and the cement. The PECP is particularly significant in combination with slag since it acts as a retarder and thus provides significant drilling fluid functions in general and specific drilling functions relative to the slag component as well as significant cement functions. PECP also reduces the friction coefficient of muds on casing and filter cake, and pullout forces required to release stuck pipe are dramatically reduced with PECP in the drilling fluid. PECP because of its tendency to absorb onto polymers and solids will act as a rheological modifier.

The unique advantage of universal fluids is that wellbore stabilization, fluid-loss control, and cuttings transport can be realized essentially the same as with conventional drilling fluid systems. However, with the simple presence of activators in the subsequent cementitious slurry, the resulting mud-slag system will develop strength. Thus, for instance, (1) drilling fluid filter cake deposited while drilling over permeable zones can be converted into an effective sealant by diffusion of activators from the mud-slag column; and (2), whole mud that has not been removed from washed-out sections of the hole during displacement will harden with time and, therefore, provide an effective sealant and lateral support to the casing.

In areas such as slim hole drilling, the ionomer universal fluid gives the process benefit of avoiding the removal of an incompatible drilling mud and the product benefit of being resistant to deflection when set.

In the case of the universal fluids, the amount of cementitious material can vary considerably and also can vary depending upon whether the cementitious component is a siliceous material, an organometal, or a polyphosphate.

Process and apparatus used to drill and cement are well known. One example can briefly illustrate typical practice as follows. A well is drilled using a hollow drill string having a drill bit with at least one orifice communicating between the inside of the hollow drill string and the outside and located at the lower end of the drill string, thus producing a wellbore. During this drilling, a drilling fluid is circulated down the inside of the drill string and out of the orifice at the lower end thereof. When the drilling is complete, the drill string is withdrawn from the wellbore. A first section of well casing, generally having a float shoe with an upper sealing surface, is inserted into the wellbore. Additional sections of casing are generally attached sequentially to the first section and the first section is inserted further into the wellbore. In accordance with one embodiment of this invention, additional drilling fluid, containing additives necessary to form a cementitious slurry, is pumped down the casing. This may be facilitated by inserting a bottom plug into the casing string, the bottom plug having a longitudinal passage and a rupturable diaphragm at the top, so that it is forced down the casing by he cementitious slurry. Thereafter, a top or second plug can be inserted into the casing string above the column of cementitious slurry, the diaphragm of the first plug ruptured, and the slurry forced up into an annulus between the outside of the casing and the inside of the borehole where, with time, it hardens.

In accordance with another embodiment of this invention, the use of these conventional plugs for separating the cementitious slurry from the drilling fluid is generally not necessary. In this embodiment the drill string is simply removed, a casing inserted, and the cementitious slurry circulated into the borehole and up the annulus. This can abe done by direct fluid contact between the displacement fluid and the cementitious slurry thus eliminating the need for a loading collar or wiper plug.

In yet another related embodiment of this invention, universal fluid is utilized in a drilling operation and thereafter additional cementitious material and/or additives, or the second component of a two-component system, is gradually added so as to gradually transition the circulating material from a drilling fluid to a cementitious slurry.

Filter Cake Setting

In yet another embodiment of this invention the drilling process is carried as described hereinabove with a universal fluid to produce a borehole through a plurality of strata thus laying down a filter cake. Prior to the cementing operation the activator or reactive second component is passed into contact with the filter cake, for instance by circulating the activator or reactive second component down the drill string and up the annulus between the drill string and the filter cake. This can be accomplished by circulating a separate fluid containing the activator or reactive second component or by adding an activator or reactive second component to the drilling fluid. Alternatively, the drill string is removed and the casing inserted and the activator or reactive second component circulated down the casing and up the annulus. As used herein 'down' as it relates to a drill string or casing, means in a direction toward the farthest reach of the borehole even though in rare instances the borehole can be disposed in a horizontal position. Similarly, 'up' means back toward the beginning of the borehole. Preferably, the circulation is carried out by using the drill string, this being the benefit of this embodiment of the invention whereby the filter cake can be "set" to shut off gas zones, water loss, or to shut off lost circulation in order to keep drilling without having to remove the drill string and set another string of casing. This can also be used to stabilize zones which may be easily washed-out (salt zones where in the salt is soluble in water, for instance) or other unstable zones. After the drilling is complete the drilling fluid is then diluted, the drill string removed, and the cementing carried out as described hereinabove.

Conventional spacers may be used in the above described sequence. Also, any left over fluid having activators therein may be displaced out of the borehole by the next fluid and/or a spacer fluid and stored for subsequent use or disposal.

In this embodiment where the filter cake is "set", the activator can be any of the alkaline activators referred to hereinabove such as a mixture of sodium hydroxide and sodium carbonate when the universal fluid contains slag, or a polymer with a functional group such as a carboxy as described hereinabove wherein the universal fluid contains a metal compound proton acceptor, or the phosphoric (or polyphosphoric) or phosphonic acid component of a phosphate or phosphonate when the universal fluid contains a metal compound proton acceptor.

In another embodiment of this invention, the drilling is done using a drilling fluid containing a metal compound to lay down a filter cake which is preferably set by circulating a polymer as described to produce an ionomer or by circulating a phosphorus acid to produce a phosphate salt. Thereafter, the cementing is done with a cementitious slurry comprising blast furnace slag and an accelerator. Also, the use of blast furnace slag as described above for the metal compound source of an ionomer or phosphate salt can be used in this embodiment as well. Thus, ionomers or phosphorus salts can be formed as filter cake followed by cementing with blast furnace slag.

Surfactants, alcohols, or blends thereof may be used in the drilling fluids of this invention to improve bonding.

Bonding Surfactants

The surfactants may be anionic, amphoteric, cationic, nonionic or blends thereof, e.g., nonionics with anionic or cationic surfactants.

The following surfactants, classes of surfactants, and mixtures of surfactants are particularly useful in the present invention:

1. Alkanol amides (nonionic):

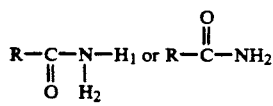

where R = a carbon chain (alkyl group) of 8–20 carbons (usually 10–18); $H_1$ and/or $H_2$ may be replaced by an alkanol such as ethanol or isopropanol. One or both of the H's may be replaced.

Examples lauric monoisopropanol amide, lauric diethanol amide, coconut diethanol amide. ALKAMIDE 2106 ® by Alkaril Chemicals, Ltd. is a coconut diethanol amide suitable for this application.

2. Ethoxylated alkyl aryl sulfonate:

Examples: nonyl phenol sulfonate with 8 moles ethylene oxide, and N-decyl benzene sulfonate with 6 moles ethylene oxide.

3. Amine oxides (nonionic):

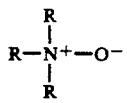

where R = alkyl carbon chains from 1 to 20 carbons, usually one chain is 10 to 18 carbons. Alkyl groups can have hydroxyl or amido functional groups in their chain.

Examples: bis(2-hydroxyethyl) coco amine oxide, bis(2-hydroxyethyl) laurel amine oxide, laurel dimethyl amine oxide, coco amidopropyl dimethyl amine oxide, cetyl dimethyl amine oxide, myristyl dimethyl amine oxide.

4. Betaines and Betaine Derivatives

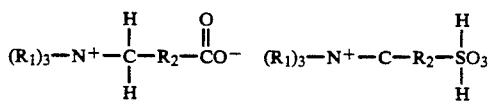

where $R_1$ = alkyl chain length between 3 and 20 carbons, $R_2$ = alkyl chain length between 1 and 4 carbons. Amide functional groups may be incorporated into the $R_1$ alkyl chain.

Examples: coco amido propyl betaine ($R_2$=propyl group 3 carbons), laurel betaine ($R_1$=laurel group of 12 carbons, no $R_2$), coco betaine ($R_1$=coco group of 12–14 carbons, no $R_2$), oleyl betaine ($R_1$—oleyl group of 18 carbons, no $R_2$), myristic betaine ($R_1$=myristyl group of 14 carbons, no $R_2$), oleamido propyl betaine, isostearamido propyl betaine, laurel sulfobetaine.

5. Ethoxylated Alcohols (nonionic):

Ethoxylated simple alcohols with linear or branched chains having between 8 and 20 carbons with 3 to 20 mole of ethylene oxide groups; 6–14 moles of ethylene oxide are typical.

Examples: $C_9$–$C_{11}$ linear alcohol with 8 moles ethylene oxide, $C_{14}$–$C_{15}$ linear alcohol with 13 moles ethylene oxide, $C_{12}$–$C_{15}$ linear alcohol with 9 moles ethylene oxide.

6. Sulfates and Sulfonates of Ethoxylated Alcohols (anionic):

The same ranges apply as in No. 5 supra except ethylene oxide moles may vary between 2 and 14.

Examples: $C_{12}$–$C_{13}$ linear alcohol sulfate or sulfonate with 3 moles ethylene oxide, $C_{12}$–$C_{15}$ linear alcohol sulfate or sulfonate with 3 moles ethylene oxide.

7. Ethoxylated Alkyl Phenols (nonionic):

Alkyl chains of 8 to 20 carbons, usually between 4 and 14 carbons and more preferred to be 8 or 9 carbons, with 4–20 moles of ethylene oxide, usually between 7 and 20 moles and more preferred to 8–12 moles.

Examples: Nonylphenol with 9 moles ethylene oxide, octylphenol with 8 moles ethylene oxide.

8. Sulfates or Sulfonates of Ethoxylated Alkyl Phenols (and their salts) (anionic):

Examples: Nonyl phenol sulfate or sulfonate with 9 moles ethylene oxide; octyl phenol sulfate or sulfonate with 8 moles ethylene oxide.

9. Fluorocrabon-based Surfactants (nonionic, amphoteric, anionic):

These must be water-soluble forms. Fluorocarbon esters such as 3M Company's FC-740 are oil soluble and not appropriate for this use. 3M Company's FC-100, FC-129, FC-170C are commercially available examples of fluorocarbon-based surfactants used in the invention.

Examples: Fluoro-octyl sulfonate or sulfate, perfluorated quaternary ammonium oxide, and fluorinated $C_9-C_{11}$ alcohols with 7 moles ethylene oxide.

10. Phosphate Derivatives of Ethoxylated Alcohols:

Examples: $C_{14}-C_{16}$ linear alcohols phosphate with 8 moles ethylene oxide; phosphated nonylphenol with 10 moles ethylene oxide.

11. Quaternary Ammonium Chloride (cationic):

Dimethyl dicoco ammonium chloride, cetyl dimethyl benzyl ammonium chloride, cetyl dimethyl ammonium chloride.

12. Sulfates or Sulfonates of Alcohols (and their salts)(Anionic):

Sulfated simple alcohols with carbon chains of 8–20, usually between 10 and 16 and most common 10–12.

Examples: Sodium lauryl sulfate or sulfonate, potassium lauryl sulfate or sulfonate, magnesium lauryl sulfate or sulfonate, sodium n-decyl sulfate or sulfonate, triethanol amine laurel sulfate or sulfonate, sodium 2-ethylhexyl sulfate or sulfonate.

13. Condensation Products of Ethylene Oxide and Propylene Glycol (nonionic):

Examples: Propoxylated $C_9-C_{14}$ alcohols with 6 moles ethylene oxide.

The surfactants or mixtures of surfactants should be soluble in the cementitious slurry and not precipitate or otherwise degrade under the action of the ions in the cementitious slurry (e.g., resistant to calcium and other electrolytes) and the temperature and pressure conditions occurring during the placement and curing of the cement.

Especially preferred are nonylphenol ethoxylates, coco amido betaine, blends of N-alkyl coco trimethyl ammonium chloride and bis(2-hydroxyethyl) cocoamide oxide, blends of ethoxylated trimethylnonanol and perfluoro quaternary ammonium oxide, $C_{12}-C_{15}$ linear alcohol ethoxylate sulfate, $C_9-C_{11}$ linear alcohol ethoxylate sulfates, sodium lauryl sulfate, and ethoxy alcohol sulfates.

The concentration of surfactant in the water phase used to prepare the slurry will generally be from about 0.1 to about 5% by weight, and more preferably from about 0.2 to about 3% by weight; excellent results have been obtained with concentrations between about 1.17 and about 2.33% by volume.

Alcohols

The invention is very effective for solidification of drilling fluids containing polyhydric alcohols. The following alcohols may be used alone or in blends with the preceding surfactants. The polyalcohol ingredients of drilling fluids containing polyalcohols are preferably acyclic polyols having at least two carbon atoms and 2 hydroxy groups but no more than 18 carbon atoms and 13 hydroxyl groups. Preferably, the polyols of the invention have at least 2 carbon atoms and 2 hydroxyl groups, but no more than 9 carbon atoms and 7 hydroxyl groups.

Non-limiting examples of such polyols include (carbons chains may be straight or branched), ethylene glycol, diethylene glycol, 1,2-propanediol, 1,3-propanediol (propylene glycol), neopentyl glycol, pentaerythritol, 1,6-hexanediol, glycerol, telomers of glycerol such as diglycerols, triglycerols, tetraglycerols, pentaglycerols, and hexaglycerols, mixtures of glycerol and telomers of glycerol such as diglycerol and triglycerols, mixtures of telomers of glycerol, polyethylene glycols, polypropylene glycols, ethylenepropylene glycol, polyethylenepropylene glycols, ethylene-propylene glycol copolymers and ethylenebutylene glycol copolymers, 1,5,6,9-decanetetrol, 1,1,4,4-cyclohexanetetramethanol, 1,2,4,5-cyclohexanetetramethanol, 1,4-cyclohexanedimethanol, 1,3-cyclopentanedimethanol, 1,2,4,7-heptanetetrol, 1,2,3,5-heptanetetrol, 1,5,8-nonanetriol, 1,5,9-nonanetriol, 1,3,5,9-nonanetetrol, 1,3,5-heptanetriol, 2,4,6-heptanetriol, 4,4-dimethyl-1,2,3-pentanetriol, 1,1,3-cyclohexanetrimethanol, 1,3,4-cycloheptanetriol, 1,1-cyclopropanediol, 1,2-cyclopropanediol, 1,2,3-cyclopropanetriol, 1,1-cyclopropanedimethanol, 1,2-cyclopropanedimethanol, 1,2,3-cyclopropanedimethanol, 1,1-cyclobutanediol, 1,2-cyclobutanediol, 1,3-cyclobutanediol, 1,2-cyclobutanedimethanol, 1,2,3-cyclobutanetriol, 1,2,4-cyclobutanetriol, 1,2,3,4-cyclobutanetetrol, 1,3-dimethyl-1,2,3,4-cyclobutanetetrol, 1-hydroxycyclobutanemethanol, 3-methyl- 2,2-butanediol, 1,2-pentanediol, 1,3-pentanediol, 1,4-pentanediol, 2,3-pentanediol, 2,4-pentanediol, 1,2,3-pentanetriol, 1,2,4-pentanetriol, 2,3,4-pentanetriol, 1,1-cyclopentanediol, 1,2- cyclopentanediol, 1,3- cyclopentanediol, 1,2,3-cyclopentanetriol, 1,2-hexanediol, 1,3-hexanediol, 1,2,3-hexanetriol, 1,2,4-hexanetriol, 1,2,3,4-hexanetetrol, 1,1-cyclohexanediol, 1,2-cyclohexanediol, 1,4-cyclohexanediol, 1,2,4-cyclohexanetriol, 1,2,5-cyclohexanetriol, 1,2,3,4-cyclohexanetetrol, 1,2,3,5-cyclohexanetetrol, sorbitol, mannitol.

More preferred alcohols are cyclicetherpolyols having at least 6 carbon atoms, at least 2 hydroxyl groups, and at least 2 ether linkages. Even more preferred are cyclicetherpolyols having at least 15 carbon atoms, 5 ether linkages, and at least 2 hydroxyl groups, or at least 15 carbon atoms, at least 7 ether linkages, and at least 3 hydroxyl groups. Most preferred are cyclicetherpolyols having at least 18 carbon atoms, at least 6 hydroxyl groups, and at least 6 ether linkages. Molecular structures with significantly larger molecular weights than the above minimums have been found to be advantageous. Among the cyclicetherpolyols, monocyclicdietherdiols are preferred and polycyclicpolyetherpolyols (referred to hereinabove as PECP) are most preferred. "Poly" is used to mean two or more.

The alcohols or mixtures of alcohols useful in this invention should be soluble in the drilling fluid of this invention at the temperature and pressure conditions occurring in the wellbore or can be solubilized as described infra. Additionally, the alcohols or mixtures of alcohols should not precipitate or otherwise degrade under the actions of the ions in the drilling fluid (e.g., resistant to calcium and electrolytes) and the temperature and pressure conditions occurring during drilling. The alcohols may also be soluble at the ambient temperature and pressure conditions on the surface during the preparation of the drilling fluid of this invention. Some of the higher molecular weight alcohols may be very viscous liquids, or solids or have low solubility at the temperature conditions at the surface under which the drilling fluid is prepared. In these cases, the alcohols may be diluted with a suitable solvent which is soluble in the drilling fluid at the temperature conditions of drilling fluid preparation at the surface. Such suitable solvents may act to both lower viscosity and to increase solubility of the higher molecular weight alcohol for addition to the drilling fluid on the surface. Such solvents may be polyols of lower molecular weight, other alcohols such as methanol, ethanol, propanol, or isopropanol, water or mixtures of solvents and water.

The concentration of alcohol in the water phase when used in the preparation of the drilling fluid of this invention will generally be at least about 2% by weight and preferably from about 2 to about 30% by weight based on the water phase and more preferable from about to about 15% by weight; excellent results have been obtained with concentrations between about 10 and about 20% by weight. Preferably at least about 1% w of the alcohol is cyclicetherpolyol or acyclic polyol, based on the total weight of the alcohol.

EXAMPLE 1

Setting cement plugs has several potential problems particularly where high strength and good adhesion to the borehole wall are needed in order to divert the path of the drill bit into the surrounding formations. First, contamination of the cement slurry with a drilling fluid generally alters the setting time and compressive strength of the cement formulation. Table 1 lists the effects of several drilling fluids on the cement.

TABLE 1

Effect of Drilling Fluid Contamination on Portland Cement Thickening Time

| Drilling Fluid Type | Cement:Drilling Fluid Volumetric Ratio | Thickening Time Hours |
|---|---|---|
| Test Temperature: 172° F. | | |
| Oil external emulsion - with 30% (bw) calcium chloride brine as internal phase | 100:0 | 4.38 |
| | 95:5 | 3.65 |
| | 75:25 | 1.98 |
| | 50:50 | 1.8 |
| Test Temperature: 150° F. | | |
| Water base Lignosulfonate | 100:0 | 4.23 |
| | 95:5 | 5.66 |
| | 75:25 | 6.5+ |
| | 50:50 | 8+ |

The effects of different drilling fluids on compressive strength of cement are shown in Table 2.

TABLE 2

Effect of Drilling Fluid Contamination on Compressive Strength of Portland Cement

| Drilling Fluid Type | Cement:Drilling Fluid Volumetric Ratio | 24 Hr Compressive Strength, psi |
|---|---|---|
| Test Temperature: 250° F. | | |
| Oil external emulsion - with 30% (bw) calcium chloride brine as internal phase | 100:0 | 2514 |
| | 90:10 | 2230 |
| | 75:25 | 660 |
| Test Temperature: 175° F. | | |
| Water base Lignosulfonate | 100:0 | 3275 |
| | 95:5 | 2670 |
| | 75:25 | 1680 |
| | 50:50 | did not set |

Spacers are often used ahead of the cement slurry to prevent contamination of the cement with the drilling fluid. These spacers are similar in composition to the drilling fluid.

Table 3 shows the effect of different types of spacer contamination on thickening time. Table 4 shows the effect of different types of spacer contamination on compressive strength.

TABLE 3

Effect of Spacer Fluid Contamination on Portland Cement Thickening Time
Test Temperature: 172° F.

| Spacer Fluid Description | Cement:Spacer Fluid Volumetric Ratio | Thickening Time Hours |
|---|---|---|
| Water base with bentonite as primary viscosifier | 100:0 | 4.38 |
| | 95:5 | 5+ |
| | 75:25 | 5+ |
| | 50:50 | 5+ |
| Water base with silicate gel as primary viscosifier | 100:0 | 4.38 |
| | 95:5 | 4.22 |
| | 75:25 | 4.75 |
| | 50:50 | 5.03 |
| Oil external emulsion with 5% KCl water as internal phase | 100:0 | 4.38 |
| | 95:5 | 4.1 |
| | 75:25 | 4.63 |
| | 50:50 | 5.97 |
| Oil external emulsion with fresh water as internal phase | 100:0 | 4.38 |
| | 95:5 | 4.47 |
| | 75:25 | 5+ |
| | 50:50 | 5+ |
| Water base with sodium silicate and carboxy methyl cellulose polymer as primary viscosifiers | 100:0 | 4.38 |
| | 95:5 | 2.47 |
| | 75:25 | 2.18 |
| | 50:50 | 2.75 |
| Water base with bentonite and cellulose derivative polymers as primary viscosifiers | 100:0 | 4.38 |
| | 95:5 | 4.31 |
| | 75:25 | 5+ |
| | 50:50 | 5+ |
| Water external emulsion with diesel oil as internal phase | 100:0 | 4.38 |
| | 95:5 | 5+ |
| | 75:25 | 5+ |
| | 50:50 | 5+ |

TABLE 4

Effect of Spacer Fluid Contamination on Portland Cement Thickening Time
Test Temperature: 250° F.

| Spacer Fluid Description | Cement:Spacer Fluid Volumetric Ratio | 24 hr Compressive Strength, psi |
|---|---|---|
| Water base with bentonite as primary viscosifier | 100:0 | 2514 |
| | 95:5 | 2531 |
| | 75:25 | 1308 |
| Water base with silicate gel as primary viscosifier | 100:0 | 2514 |
| | 95:5 | 2283 |
| | 75:25 | 1263 |
| Oil external emulsion with 5% KCl water as internal phase | 100:0 | 2514 |
| | 95:5 | 2549 |
| | 75:25 | 1342 |
| Oil external emulsion with fresh water as internal phase | 100:0 | 2514 |
| | 95:5 | 1699 |
| | 75:25 | 693 |
| Water base with sodium silicate and carboxy methyl cellulose polymer as primary viscosifiers | 100:0 | 2514 |
| | 95:5 | 1330 |
| | 75:25 | 1042 |
| Water base with bentonite and cellulose derivative polymers as primary viscosifiers | 100:0 | 2514 |
| | 95:5 | 1690 |
| | 75:25 | 795 |
| Wter external emulsion with diesel oil as internal phase | 100:0 | 2514 |
| | 95:5 | 1803 |
| | 75:25 | did not set |

Table 5 contains shear bond data showing the effect of drilling fluid or spacer coatings on the shear bond strength between cement and a clean steel surface.

TABLE 5

Effect of Drilling Fluid or Spacer Coating on Shear Bond Between Portland Cement and a Steel Surface

| Coating Material on Surface of Steel Rod | Shear Bond Strength psi |
| --- | --- |
| None - Clean steel surface | 170 |
| Water base drilling fluid | 55 |
| Water base spacer fluid | 80 |
| Oil base drilling fluid | 5 |
| Oil base spacer fluid | 25 |

The density of many materials used for sidetracking plugs is greater than the drilling fluid density. The primary reason for this is higher compressive strength and greater drilling resistance. For cement plugs, lower water to cement ratios are required to provide greater strength. Greater strength often is used to offset the potential strength reduction due to contamination by the drilling fluid. The disadvantage of high density formulations is the possibility of the plug falling through the drilling fluid below the interval where the plug is desired.

EXAMPLE 2

Base Mud: Fresh water mud containing bentonite, chrome lignosulfonate, and low viscosity polyanionic cellulose.

300 lbs of hard burned magnesium oxide, under the trade name of "MAGCHEM 10 CR" by Martin Marietta Magnesia Specialties was added to weight the base mud up to 12.6 lbs/gal. Varying amounts of an ammonium polyphosphate solution were added to solidify the mud. The ammonium polyphosphate solution used is "POLY-N" sold by Arcadian Corporation and contains about 50 wt% ammonium polyphosphate. The results are described in the following table.

| Amount of Poly-N Added, % by volume of the mud | Resulting Density lbs/gal | Description of the resulting solid |
| --- | --- | --- |
| 0 | 12.6 | Did Not Set |
| 25 | 12.4 | Set, resilient 50 psi after 4 hrs |
| 50 | 12.3 | Set, resilient 40 psi after 4 hrs |
| 100 | 12.2 | Set, resilient 30 psi after 4 hrs |

This example shows that solutions of polyphosphates can be used as diluents while also converting the drilling fluid into a solid.

EXAMPLE 3

Base mud: Fresh water mud containing bentonite, chrome lignosulfonate, and low viscosity polyanionic cellulose.

300 lbs of hard burned magnesium oxide, under the trade name of "MAGCHEM 10 CR" by Martin Marietta Magnesia Specialties was added to weight the base mud up to 12.6 lbs/gal. Varying amounts of a monoammonium phosphate were added to solidify the mud. The results are described in the following Table.

| Amount of MAP Added, % by wt of MgO of the mud | Resulting Density lbs/gal | Description of the resulting solid |
| --- | --- | --- |
| 0 | 12.6 | Did Not Set |
| 25 | 12.6 | Set, resilient 50 psi after 4 hrs |
| 50 | 12.7 | Set, resilient 250 psi after 2 hrs |
| 100 | 12.85 | Set, hard 510 psi after 2 hrs |

EXAMPLE 4

Base Mud: Fresh water mud containing bentonite, chrome lignosulfonate, and low viscosity polyanionic cellulose.

300 lbs of hard burned magnesium oxide, under the trade name of "MAGCHEM 10 CR" by Martin Marietta Magnesia Specialties was added to weight the base mud up to 12.6 lbs/gal. Varying amounts of a polyacrylic acid solution were added to solidify the mud. The polyacrylic acid had an average molecular weight of about 20,000 and is sold by PolySciences, Inc. The solution contained about 40 wt% polyacrylic acid. The results are described in the following Table.

| Amount of Polyacrylic Acid Added, % by volume of the mud | Resulting Density lbs/gal | Description of the resulting solid |
| --- | --- | --- |
| 0 | 12.6 | Did Not Set |
| 25 | 11.9 | Set, resilient good adhesion to surfaces 40 psi after 4 hrs |
| 50 | 11.5 | Set, resilient good adhesion to surfaces 40 psi after 4 hrs |
| 100 | 10.9 | Set, highly pliable good adhesion to surfaces 10 psi after 4 hrs |

This Example shows that solutions of functional group-containing polymers can be used as diluents while also converting the drilling fluid into a solid.

EXAMPLE 5

Base Mud: Fresh water mud containing bentonite, chrome lignosulfonate, and low viscosity polyanionic cellulose.

300 lbs of hard burned zinc oxide, prepared in the laboratory by heating analytical grade zinc oxide at 1350 C for 8 hours, cooling and grinding to pass through a 325 mesh screen, was added to weight the base mud up to 13.5 lbs/gal. Varying amounts of a polyacrylic acid solution were added to solidify the mud. The polyacrylic acid had an average molecular weight of about 50,000 and is sold by PolySciences, Inc. The solution contained about 25 wt% polyacrylic acid. The results are described in the following Table.

| Amount of Polyacrylic Acid Added, % by volume of the mud | Resulting Density lb/gal | Description of the resulting solid |
| --- | --- | --- |
| 0 | 13.5 | Did Not Set |
| 100 | 11.3 | Set, ductile 310 psi after 4 hrs |

EXAMPLE 6

Base Mud: Fresh water mud containing bentonite, chrome lignosulfonate, and low viscosity polyanionic cellulose 300 lbs of hard burned magnesium oxide, under the trade name of "MAGCHEM 10 CR" by Martin Marietta Magnesia Specialties was added to weight the base mud up to 12.6 lbs/gal. Varying amounts of ethylene/acrylic acid copolymers were added by weight of the magnesium oxide. The copolymers used were "ACLYN" 540, 580, and 5120 sold by Allied Signal, Inc. These copolymers have low molecular weights and varying amounts of acrylic acid incorporated into the polymer. AC 540 has the lowest acrylic acid content and AC 5120 has the highest acrylic acid content.

Each mixture was heated to a temperature above the melting point of the copolymer and held at that temperature for 24 hours. The average melting point temperature for each of these coplymers was about 100° C. After 24 hours the samples were cooled and extracted from the molds. Each had set to form a cohesive solid having compressive strengths between 50 and 700 psi. All samples were ductile and good adhesion to metal surfaces.

EXAMPLE 7

Base Mud: Fresh water mud containing bentonite, chrome lignosulfonate, and low viscosity polyanionic cellulose.

350 lbs of blast furnace slag sold under the trade name of "NEWCEM" by Blue Circle Cement Company was added to weight the mud to lbs/gal. An equal volume amount of a polyacrylic acid solution were added to solidify the mud. The polyacrylic acid had an average molecular weight of about 50,000 and is sold by PolySciences, Inc. The solution contained about 25 wt% polyacrylic acid. The results are described in the following Table.

| Amount of Polyacrylic Added, % by volume of the mud | Resulting Density lbs/gal | Description of the resulting solid |
|---|---|---|
| 0 | 12.6 | Did Not Set |
| 100 | 10.9 | Set, ductile 130 psi after 4 hrs |

What is claimed:

1. A method for directionally drilling a well, comprising:
   preparing a cementitious slurry comprising:
   (a) a cementitious component selected from blast furnace slag and proton acceptor metal compound; and
   (b) an activator wherein, when said cementitious component is said blast furnace slag, said activator is an alkaline agent, and when said cementitious component is said metal compound, said activator is a phosphorus acid or one of a polymer component of the formula:

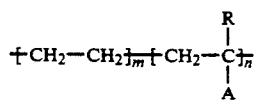

wherein A is

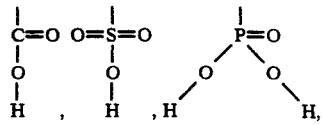

or a mixture of

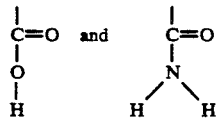

and wherein R and H or a 1-10 carbon atom alkyl radical and the ratio of m to n is within the range of 0.1 to 100:1;

(c) a water source selected from water, brine, seawater, water base drilling fluid, and water emulsion drilling fluid; and drilling the borehole with a universal fluid containing a minor quantity of the cementitious slurry, and depositing a settable filter cake on the wall of the borehole;

displacing the slurry in the wellbore to a location therein where said direction of drilling is to be changed;

allowing the filter cake to set and the slurry to solidify and form a plug across a soft formation wherein it is otherwise difficult to achieve the correct angle and direction when drilling;

drilling a pilot hole in said plug in the desired new direction of drilling; and continuing the direction of drilling of said wellbore by way of said pilot hole in said cement plug.

2. The method of claim 1 wherein the well is cemented by adding a major quantity of the cementitious slurry to the universal fluid.

3. The method of claim 1 wherein the cementitious slurry is the blast furnace slag and the alkaline agent.

4. The method of claim 1 wherein the cementitious slurry is the proton accepter metal compound and the phosphorus acid.

5. A method for directionally drilling a well, comprising:
   preparing a cementitious slurry comprising:
   (a) a cementitious component which is a proton accepter metal compound; and
   (b) an activator which is a polymer component of the formula:

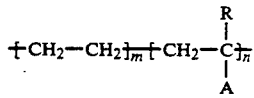

wherein A is

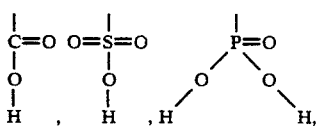

or a mixture of

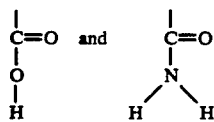

and wherein R and H or a 1-10 carbon atom alkyl radical and the ratio of m to n is within the range of 0:1 to 100:1;

(c) a water source selected from water, brine, seawater, water base drilling fluid, and water emulsion drilling fluid; and displacing the slurry in the wellbore to a location therein where said direction of drilling is to be changed;

allowing the slurry to solidify and form a plug;

drilling a pilot hole in said plug in the desired new direction of drilling; and continuing the direction of drilling of said wellbore by way of said pilot hole in said cement plug.

* * * * *